(12) United States Patent
Miyazaki et al.

(10) Patent No.: US 6,441,863 B1
(45) Date of Patent: Aug. 27, 2002

(54) IMAGE PROCESSING APPARATUS, IMAGE PROCESSING METHOD, AND TELEVISION RECEIVER

(75) Inventors: Shinichiro Miyazaki; Akira Shirahama, both of Kanagawa; Takeshi Ohno, Saitama, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/355,073

(22) Filed: Aug. 23, 1999

(30) Foreign Application Priority Data

Nov. 26, 1997 (JP) .............................................. 9-324439

(51) Int. Cl.[7] .............................................. H04N 5/445
(52) U.S. Cl. ...................................... 348/567; 348/581
(58) Field of Search .............................. 348/565, 566, 348/567, 568, 561, 563, 564, 581, 704, 718; 345/667, 668, 670, 671, 298

(56) References Cited

U.S. PATENT DOCUMENTS

| | | | | |
|---|---|---|---|---|
| 4,816,915 A | * | 3/1989 | Imai et al. ................... | 348/565 |
| 4,961,188 A | | 10/1990 | Lau | |
| 5,260,978 A | | 11/1993 | Fleischer et al. | |
| 5,781,599 A | | 7/1998 | Shiga | |
| 6,008,854 A | * | 12/1999 | Shimizu ...................... | 348/445 |
| 6,160,590 A | * | 12/2000 | Shimizu et al. ............. | 348/567 |

FOREIGN PATENT DOCUMENTS

| | | |
|---|---|---|
| JP | 07-079389 | 3/1995 |
| JP | 8-149428 | 6/1996 |
| JP | 08-214228 | 8/1996 |
| JP | 8-340350 | 12/1996 |
| JP | 8-340514 | 12/1996 |
| JP | 9-36867 | 2/1997 |
| JP | 10-004526 | 1/1998 |
| JP | 10-51769 | 2/1998 |
| JP | 10-126371 | 5/1998 |

* cited by examiner

*Primary Examiner*—Michael H. Lee
(74) *Attorney, Agent, or Firm*—Frommer Lawrence & Haug LLP; William S. Frommer

(57) ABSTRACT

There is provided delay means for allowing a delay difference to be provided between the timing of image size information which is set into writing side memory control means and the timing of image size information which is set into reading side memory control means in a manner such that the image size when data is written into first and second field memories and the image size when the data is read out from the first and the second field memories coincide. The image size information is set into the writing side memory control means and the reading side memory control means so as to have a delay difference between them. The image size is set by controlling the first and the second field memories in accordance with the image size information by the writing side memory control means and the reading side memory control means. A switching control of every field is performed in a manner such that while the writing process is performed to one of the field memories, the reading process is performed to the other field memory.

15 Claims, 9 Drawing Sheets

*Fig. 1A*
1st LINE DATA | D00 | D01 | D02 | D03 | D04 | D05 | D06 |
*Fig. 1B*
1st LINE We 
*Fig. 1C*
(1+1)th LINE DATA | D10 | D11 | D12 | D13 | D14 | D15 | D16 |
*Fig. 1D*
(1+1)th LINE We 
*Fig. 2*
| 1st LINE | D00 | D02 | D04 | D06 | D08 |
| (1+2)th LINE | D20 | D22 | D24 | D26 | D28 |
| (1+4)th LINE | D40 | D42 | D44 | D46 | D48 |

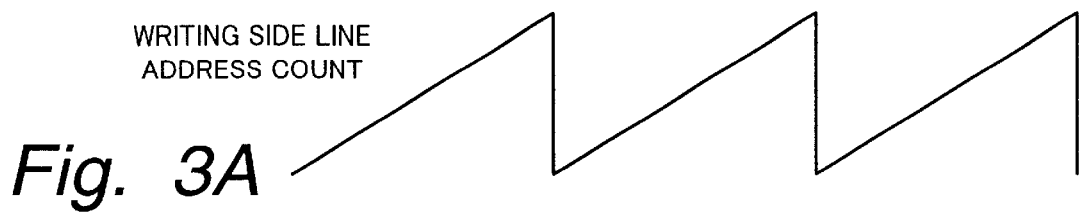
Fig. 3A
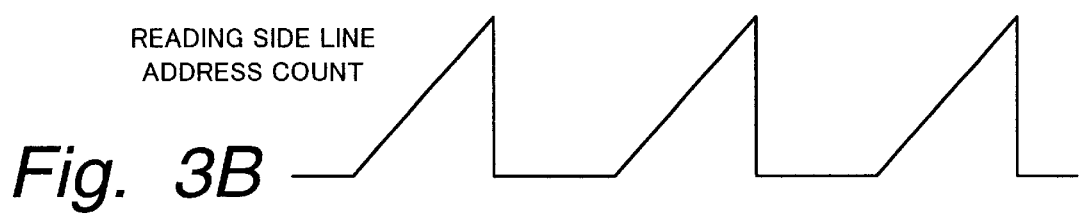
Fig. 3B
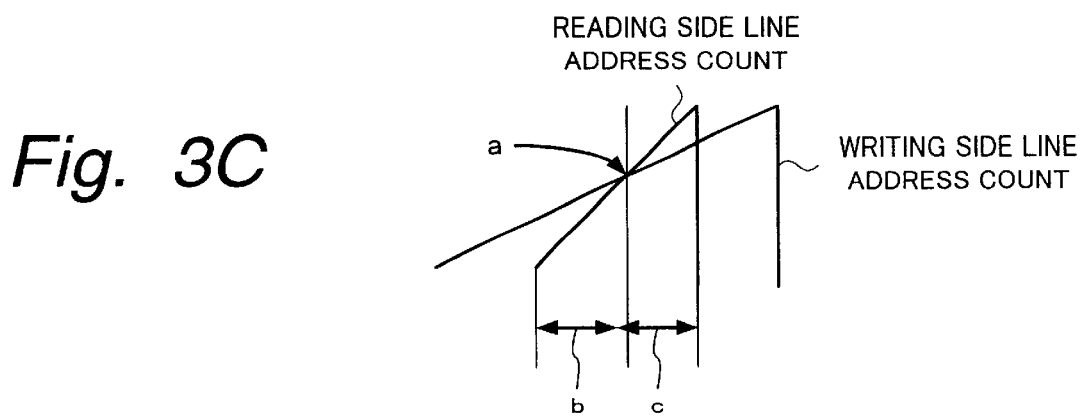
Fig. 3C

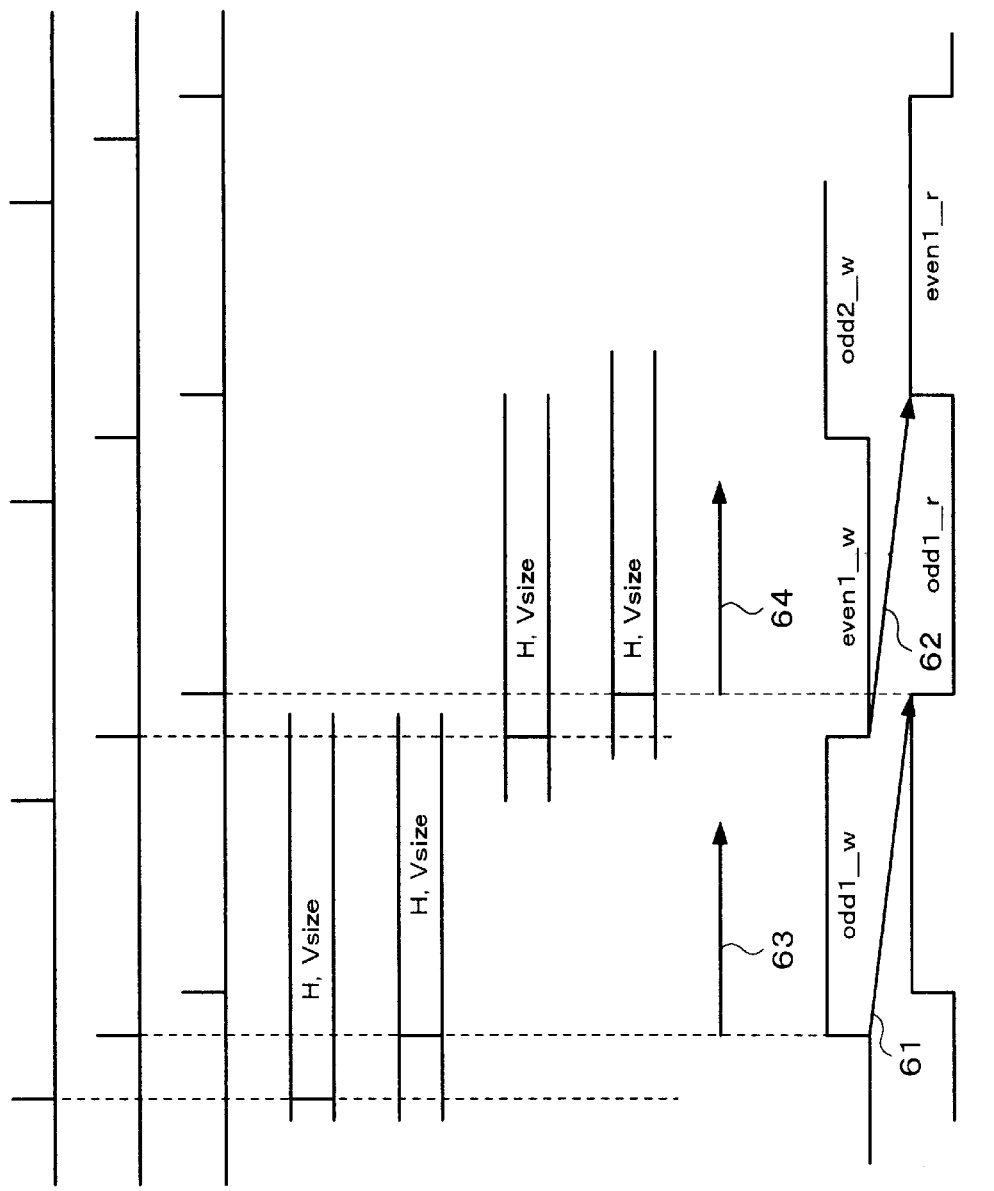

IMAGE PROCESSING APPARATUS, IMAGE PROCESSING METHOD, AND TELEVISION RECEIVER

TECHNICAL FIELD

The invention relates to an image processing apparatus and an image processing method which are suitable for use in realization of a picture-in-picture function or a picture-and-picture function and relates to a television receiver or the like having such an image processing circuit.

BACKGROUND ART

In a recent television receiver, a receiver which can perform what is called a picture-in-picture (hereinbelow, referred to as a PinP) to simultaneously display a slave picture plane for an inherent master picture plane or a picture-and-picture (hereinbelow, referred to as a PandP) to simultaneously display two picture planes is being spread. To realize the PinP function or PandP function, an image processing circuit to perform a synchronous crossover or set an image size and a display position is provided in such a kind of television receiver.

The image processing circuit can be constructed by: a field memory; interpolation processing circuits provided at the front and post stages of the field memory; and a memory controller to control the field memory in accordance with the image size and the display position.

That is, in case of reducing the image size, an interpolating process is performed in the interpolation processing circuit at the front stage of the field memory in order to improve a picture quality. An input digital video signal is decimated in accordance with the image size every pixel in the horizontal direction and every line in the vertical direction and the resultant video signal is written into the field memory. The video signal in the field memory is continuously read out.

For example, FIGS. 1A to 1D and 2 show an example in case of reducing an original image of (720 pixels×240 lines) to an image of (360 pixels×120 lines).

As shown in FIG. 1A, as an original image, sampling image data D00, D01, D02, D03, . . . is inputted in the first one line. In the next (1+1)th line, as shown in FIG. 1C, sampling image data D10, D11, D12, D13, . . . is inputted.

In this case, in the horizontal direction, as shown in FIG. 1B, a write enable signal We is inputted to a field memory every sample and a decimation is performed so as to reduce the number of samples into ½ in the horizontal direction. In the vertical direction, the write enable signal We is inputted every line (refer to FIGS. 1B and 1D) and a decimation is performed so as to reduce the number of lines into ½ in the vertical direction.

Thus, the data of each sample is decimated with respect to the horizontal direction and the data of each line is decimated with respect to the vertical direction. As shown in FIG. 2, a video signal is written into the field memory in a state where it is reduced into ½.

When the data is continuously read out from the field memory in which the video signal in which the number of samples in the horizontal direction was decimated into ½ and the number of lines in the vertical direction was decimated into ½ as mentioned above has been stored, the original image of (720 pixels×240 lines) can be reduced into the image of (360 pixels×120 lines).

In case of magnifying the image size, the input video signal is continuously written into the field memory. The video signal in the field memory is read out in accordance with the image size and a magnifying process by an interpolation is performed at the post stage of the field memory.

As mentioned above, the image processing circuit can be constructed by the field memory, the interpolation processing circuits provided at the front and post stages of the field memory, and the memory controller. However, if it is intended to realize such an image processing circuit by one field memory, there occurs a problem such that the reading position in the field memory overtakes the writing position and a time-dependent discontinuity occurs.

For example, in case of reducing the image size, as mentioned above, the video signal is written into the field memory while decimating the samples and lines of the input video signal and the data is continuously read out from the field memory. In this case, therefore, an address counter on the reading side is incremented faster than an address counter on the writing side.

That is, now assuming that the video signal is written into the field memory on the basis of a line address count signal on the writing side as shown in FIG. 3A, the video signal is read out by a line address count signal as shown in FIG. 3B on the reading side. Since the address counter on the reading side is incremented faster than that on the writing side as mentioned above, as shown in FIG. 3C, when the synchronous crossover and the size switching are simultaneously performed, an overtake occurs at a point (a) where an address count signal on the reading side and an address count signal on the writing side intersect. Present field data is read out for a period of time (b). Past field data is read out for a period of time (c). Thus, a time-dependent discontinuity occurs.

To solve the above problem, as shown in FIG. 4, an apparatus such that two field memories 231 and 232 are provided and the reading and writing operations are alternately performed in the two field memories 231 and 232 every field has been proposed.

In FIG. 4, a memory portion 201 is constructed by the two field memories 231 and 232 and two switching circuits 233 and 234. The writing and reading operations of the two field memories 231 and 232 are switched by the switching circuits 233 and 234.

The switching circuits 233 and 234 equivalently express processes which are eventually performed by performing writing and reading controls to the two field memories 231 and 232.

A writing side memory control circuit 204 and a reading side memory control circuit 205 are provided for the memory portion 201. The writing side memory control circuit 204 controls the field memory serving as a writing side between the field memories 231 and 232. The reading side memory control circuit 205 controls the field memory serving as a reading side between the field memories 231 and 232.

A horizontal/vertical interpolation processing circuit 202 performs an interpolating process so as not to cause a deterioration in picture plane when the image size is reduced. That is, when the image size is reduced, the decimating process is performed in the memory portion 201. If the decimating process is simply performed, however, an aliasing distortion occurs and the picture quality deteriorates. Therefore, the interpolating process is performed in the horizontal/vertical interpolation processing circuit 202 so as not to deteriorate the picture quality. A horizontal/vertical interpolation processing circuit 203 for a magnifying process performs a magnification interpolating process when the image size is magnified. Control information for image processes is supplied to a bus decoder 206 through an internal bus led out from a system controller of the television receiver although not shown. The control information is generated, for example, in accordance with a setting state of a switch or the like on an operation panel of the television receiver.

Image size information (H, VSize) is formed from the bus decoder 206 in accordance with the control information from the system controller. The image size information (H, VSize) is supplied to latch circuits 211 and 212. The image size information (H, VSize) is inputted to the latch circuits 211 and 212 at a timing of a vertical read clock fvr. Outputs of the latch circuits 211 and 212 are supplied to the writing side memory control circuit 204 and reading side memory control circuit 205 and to a magnification/reduction ratio calculating circuit 207.

The magnification/reduction ratio calculating circuit 207 forms interpolation processing information according to its aspect ratio on the basis of the image size information (H, VSize). In case of the reducing process, the interpolation processing information formed in the magnification/reduction ratio calculating circuit 207 is supplied to the horizontal/vertical interpolation processing circuit 202 for the reducing process. In case of the magnifying process, the interpolation processing information formed in the magnification/reduction ratio calculating circuit 207 is supplied to the horizontal/vertical interpolation processing circuit 203 for the magnifying process.

In the writing side memory control circuit 204, the writing side field memory between the field memories 231 and 232 is controlled in accordance with the image size information (H, VSize). Similarly, in the reading side memory control circuit 205, the reading side field memory between the field memories 231 and 232 is controlled in accordance with the image size information (H, VSize).

In case of performing the process to reduce the image size, the image size information (H, VSize) to set a reduced picture plane is outputted from the bus decoder 206. The image size information (H, VSize) to set the reduced picture plane is fetched by the latch circuit 211 at the timing of the vertical read clock fvr, supplied to the writing side memory control circuit 204 and reading side memory control circuit 205, fetched by the latch circuit 212 at the timing of the vertical read clock fvr, and supplied to the magnification/reduction ratio calculating circuit 207. In case of reducing the image size, interpolation processing information for the horizontal/vertical interpolation processing circuit 202 is calculated by the magnification/reduction ratio calculating circuit 207 in accordance with the image size information (H, VSize). The interpolation processing information is set into the horizontal/vertical interpolation processing circuit 202.

A digital video signal is inputted to an input terminal 221. The video signal is supplied to the horizontal/vertical interpolation processing circuit 202. In the horizontal/vertical interpolation processing circuit 202, an interpolating process is performed to prevent the deterioration in picture quality on the basis of the interpolation processing information from the magnification/reduction ratio calculating circuit 207.

The writing and reading operations of the field memories 231 and 232 are switched every field by the switching circuits 233 and 234. An output of the horizontal/vertical interpolation processing circuit 202 is written into the field memory serving as a writing side between the field memories 231 and 232 through the switching circuit 233.

The writing operation to the field memory is controlled by the writing side memory control circuit 204. In case of reducing the image size, the input video signal is decimated by the writing side memory control circuit 204 and written into the field memory 231 or 232. After completion of the writing of the video signal of one field, the switching circuit 233 is switched and the writing side field memory is switched.

The reading operation from the field memory serving as a reading side between the field memories 231 and 232 is controlled by reading side memory control circuit 205. In case of magnifying the image size, the video signal of one field is continuously read out from the field memory serving as a reading side between the field memories 231 and 232. After completion of the reading of the video signal of one field, the switching circuit 234 is switched and the reading side field memory is switched.

An output of the switching circuit 234 is supplied to the horizontal/vertical interpolation processing circuit 203. In case of reducing the image size, the output of the switching circuit 234 is outputted as it is from an output terminal 222 through the horizontal/vertical interpolation processing circuit 203.

The video signal decimated in accordance with the image size is stored into the field memories 231 and 232 and the video signal is continuously read out from the field memories, so that the image of the reduced image size is obtained from the video signal of the output terminal 222.

In case of performing the process to magnify the image size, the image size information (H, VSize) to set a magnified picture plane is outputted from the bus decoder 206. The image size information (H, VSize) to set the magnified picture plane is fetched into the latch circuit 211 at the timing of the vertical read clock fvr, supplied to the writing side memory control circuit 204 and reading side memory control circuit 205, fetched into the latch circuit 212 at the timing of the vertical read clock fvr, and supplied to the magnification/reduction ratio calculating circuit 207. In case of magnifying the image size, the interpolation processing information for the horizontal/vertical interpolation processing circuit 203 is calculated by the magnification/reduction ratio calculating circuit 207 in accordance with the image size information (H, VSize). The interpolation processing information is set into the horizontal/vertical interpolation processing circuit 203.

The digital video signal is inputted to the input terminal 221. The video signal is supplied to the horizontal/vertical interpolation processing circuit 202. In case of magnifying the image size, the video signal from the input terminal 221 is supplied as it is to the switching circuit 233 through the horizontal/vertical interpolation processing circuit 202.

The writing and reading operations of the field memories 231 and 232 are switched by the switching circuits 233 and 234 every field. An output of the horizontal/vertical interpolation processing circuit 202 is written into the field memory serving as a writing side between the field memories 231 and 232 through the switching circuit 233.

The writing operation to the field memory is controlled by the writing side memory control circuit 204. In case of magnifying the image size, the input video signal is continuously written into the field memories 231 and 232. After completion of the writing of the video signal of one field, the switching circuit 233 is switched and the writing side field memory is switched.

The reading operation from the field memory serving as a reading side between the field memories 231 and 232 is controlled by reading side memory control circuit 205. In case of magnifying the image size, the video signal of one field is read out from the field memory serving as a reading side between the field memories 231 and 232 in accordance with the image size. After completion of the reading of the video signal of one field, the switching circuit 234 is switched and the reading side field memory is switched.

The output of the switching circuit 234 is supplied to the horizontal/vertical interpolation processing circuit 203. In case of magnifying the image size, the interpolating process is performed in the horizontal/vertical interpolation processing circuit 203 on the basis of the interpolation processing information from the magnification/reduction ratio calculating circuit 207 in order to magnify and interpolate the picture plane.

The video signal in the field memories is read out in accordance with the image size and the interpolation magnifying process is performed in the horizontal/vertical interpolation processing circuit 203. Thus, the magnified and interpolated image is obtained from the output terminal 222.

As shown in FIG. 4, by providing the two field memories 231 and 232 for the memory portion 201 and switching and using the two field memories 231 and 232, as shown in FIG. 5, the problem such that the reading position overtakes the writing position can be solved by latching a switching signal of the writing side field memory by a vertical read start pulse signal and switching the reading side field memory by the latched signal.

In FIG. 5, a write enable signal is supplied to an input terminal 243. The write enable signal from the input terminal 243 is selectively supplied to the field memories 231 and 232 through a switching circuit 235. The switching circuit 235 is switched by a field switching signal wfsw on the writing side from an input terminal 244. When the write enable signal is inputted to the field memories 231 and 232, data can be written into the field memories 231 and 232.

The writing side field switching signal wfsw and the write enable signal are outputted from the writing side memory control circuit 204 in FIG. 4. The operation to selectively supply the write enable signal to the field memories 231 and 232 by the writing side field switching signal wfsw corresponds to the operation to switch the switching circuit 233 in FIG. 4.

A read enable signal is supplied to an input terminal 245. The read enable signal is selectively supplied to the field memories 231 and 232 through a switching circuit 236. The switching circuit 236 is switched by a field switching signal rfsw on the reading side from a latch circuit 247. When the read enable signal from the input terminal 245 is inputted to the field memories 231 and 232, the data can be read out from the field memories 231 and 232.

The reading side field switching signal rfsw and the read enable signal are outputted from the memory control circuit 205 on the reading side in FIG. 4. The operation to selectively supply the read enable signal to the field memories 231 and 232 by the reading side field switching signal rfsw corresponds to the operation to switch the switching circuit 234 in FIG. 4.

The writing side field switching signal wfsw is supplied to an input terminal 246. The writing side field switching signal wfsw is supplied to the latch circuit 247.

A vertical read start pulse signal rstat is formed in a start position detecting circuit 248 at a vertical read start timing. The vertical read start pulse signal rstat is supplied to the latch circuit 247.

The writing side field switching signal wfsw from the input terminal 246 is latched by the latch circuit 247. An output of the latch circuit 247 is supplied as a reading side field switching signal rfsw to the switching circuit 236.

With respect to the writing process, as shown in FIG. 6A, the field memories 231 and 232 are switched by the writing side field switching signal wfsw. For example, the data is written into the field memory 231 for a field period of time when the writing side field switching signal wfsw is set to the high level. The data is written into the field memory 232 for a field period of time when the writing side field switching signal wfsw is set to the low level.

With regard to the reading process, it is switched by the reading side field switching signal rfsw (FIG. 6C) formed by sampling the writing side field switching signal wfsw (FIG. 6A) by the vertical read start pulse signal rstat (FIG. 6B). For example, the data is read out from the field memory 231 for a field period of time when the reading side field switching signal rfsw is set to the low level. The data is read out from the field memory 232 for a field period of time when the reading side field switching signal rfsw is set to the high level. Therefore, as shown by arrows 91 and 92 in FIGS. 6A to 6D, the data is read out in a state accompanied with a delay of about one field period for the writing process.

As mentioned above, by always controlling such that while the writing process is performed to one of the two field memories, the reading process is performed to the other field memory, the processes for the synchronous crossover and the size change can be performed without causing a situation such that the reading position overtakes the writing position.

In the image processing apparatus in which the countermeasure against the overtaking as mentioned above was taken, however, the image size is changed simultaneously in both of the writing process and the reading process in spite of a fact that the reading timing is delayed from the writing timing by about one field period. Consequently, there occurs a problem such that when the image size is continuously changed, the image size upon writing and that upon reading differ.

For example, now assuming that the image size is changed from (M×N) to ((M/2)×(N/2)) at a timing shown by an arrow 93 in FIG. 6D, at this timing, the new image size information (H, VSize) is set into the writing side memory control circuit 204 and reading side memory control circuit 205 in FIG. 4 at the same timing. Therefore, from this time point, as shown in a hatched region 99 in FIG. 8, the writing operation is performed to the writing side field memory (for example, field memory 231) on the basis of the new image size ((M/2)×(N/2)). The reading operation is performed to the reading side field memory (for example, field memory 232) on the basis of the new image size ((M/2)×(N/2)) as shown in a hatched region 97 in FIG. 7.

However, since the image size has been set to (M×N) at a timing before such a timing, as shown in a hatched region 98 in FIG. 7, the data of the image size (M×N) so far has already been written in the reading side field memory (for example, field memory 232). Therefore, the data of the (M×N) pixels is read out as data of the image size of ((M/2)×(N/2)).

As mentioned above, in the conventional image processing circuit shown in FIG. 4, there is a problem such that when the image size is continuously changed, the image size in the case where the writing was performed and the image size in the case where the reading is performed differ.

It is, therefore, an object of the invention to provide an image processing apparatus, an image processing method, and a television receiver, in which an image size can be continuously smoothly changed in consideration of setting timings of an image size upon writing and an image size upon reading in association with processes which are executed in an image processing apparatus in which a countermeasure against an overtake has been taken.

DISCLOSURE OF INVENTION

According to the invention, there is provided an image processing apparatus comprising: a first field memory and a second field memory; writing side memory control means for controlling the operation of a field memory serving as a writing side between the first field memory and the second field memory; reading side memory control means for controlling the operation of a field memory serving as a reading side between the first field memory and the second field memory; and delay means for allowing a delay difference to be provided between a timing of image size information which is set in the writing side memory control means and a timing of image size information which is set in the reading side memory control means in a manner such that an image size when data is written into the first and the second field memories and an image size when the data is read out from the first and the second field memories coincide, characterized in that the image size information is set so that the writing side memory control means and the reading side memory control means have the delay difference, the image size is set by controlling the first field memory and the second field memory by the writing side memory control means and the reading side memory control means in accordance with the image size information, and a switching control of every field is performed in a manner such that while a writing process is performed to one of the field memories, a reading process is performed to the other field memory.

According to the invention, there is provided an image processing method characterized by comprising the steps of: controlling a field memory serving as a writing side between a first field memory and a second field memory by memory control means on the writing side and controlling the field memory serving as a reading side by memory control means on a reading side; allowing a delay difference to be provided between a setting timing of image size information which is set into the writing side memory control means and a setting timing of image size information which is set into the reading side memory control means in a manner such that an image size when data is written into the first and the second field memories and an image size when the data is read out from the first and the second field memories coincide and setting the image size information into the writing side memory control means and the reading side memory control means; setting the image size by controlling the first field memory and the second field memory by the writing side memory control means and the reading side memory control means in accordance with the image size information; and performing a switching control of every field in a manner such that while a writing process is performed to one of the field memories, a reading process is performed to the other field memory.

According to the invention, there is provided a television receiver comprising: first demodulating means for demodulating a first video signal; second demodulating means for demodulating a second video signal; and image processing means for processing the first and/or the second video signal so as to synthesize the first video signal demodulated by the first demodulating means and the second video signal demodulated by the second demodulating means, characterized in that the image processing means is constructed by a first field memory, a second field memory, writing side memory control means for controlling the operation of a field memory serving as a writing side between the first field memory and the second field memory, reading side memory control means for controlling the operation of a field memory serving as a reading side between the first field memory and the second field memory, and delay means for allowing a delay difference to be provided between a timing of image size information which is set in the writing side memory control means and a timing of image size information which is set in the reading side memory control means in a manner such that an image size when data is written into the first and the second field memories and an image size when the data is read out from the first and the second field memories coincide, the image size information is set so that the writing side memory control means and the reading side memory control means have a delay difference, the image size is set by controlling the first field memory and the second field memory by the writing side memory control means and the reading side memory control means in accordance with the image size information, and a switching control of every field is performed in a manner such that while a writing process is performed to one of the field memories, a reading process is performed to the other field memory.

A latch circuit is provided as timing control means for controlling the timing to perform a changing process of the image size. The changing process of the image size is performed on the basis of control information which is supplied through the latch circuit. A timing to change the image size in the reading process is delayed for a timing to change the image size in the writing process in accordance with the delay difference between a writing timing to the field memories and a reading timing therefrom in association with a process of a countermeasure against an overtake.

Therefore, even in the case where sizes and display positions of two picture planes are arbitrarily set and synchronous crossovers are simultaneously performed, an overtake such that the time relation of the data is reversed is not caused when the image data is read out, and even in case of continuously changing the size, the writing image size to the field memories and the reading image size therefrom can be always made coincide, and a smooth display can be performed.

BRIEF DESCRIPTION OF DRAWINGS

FIGS. 1A to 1D are timing charts for use in explanation of a conventional image conversion processing circuit;

FIG. 2 is a schematic diagram for use in explanation of the conventional image conversion processing circuit;

FIGS. 3A to 3C are schematic diagrams for use in explanation of an overtake which occurs in the image conversion processing circuit;

FIGS. 11A to 11J are timing charts for use in explanation of an example of the image conversion processing circuit to which the invention is applied.

BEST MODE FOR CARRYING OUT THE INVENTION

Figure 4:
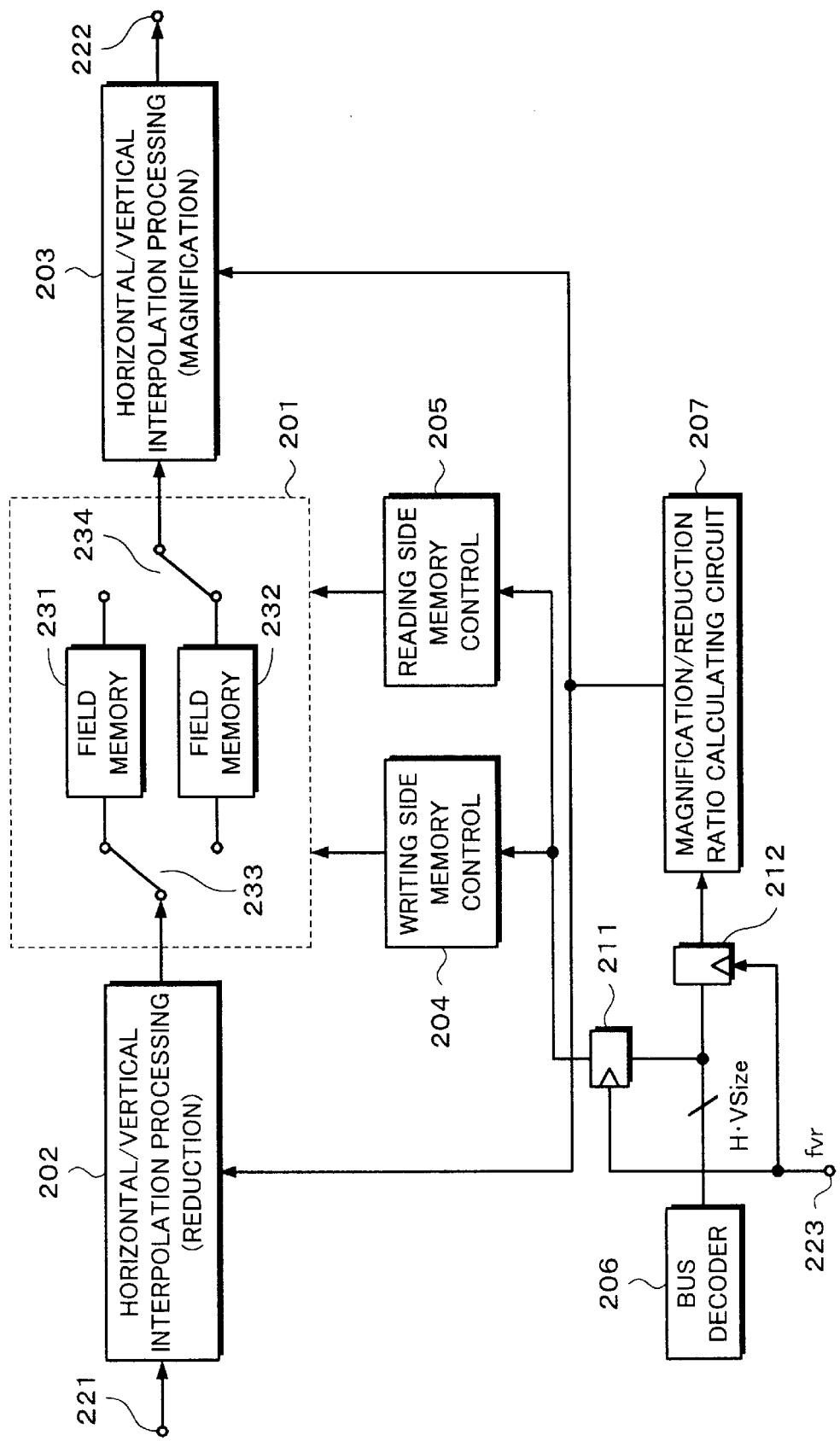
FIG. 4 is a block diagram of an example of the conventional image conversion processing circuit.
Figure 5:
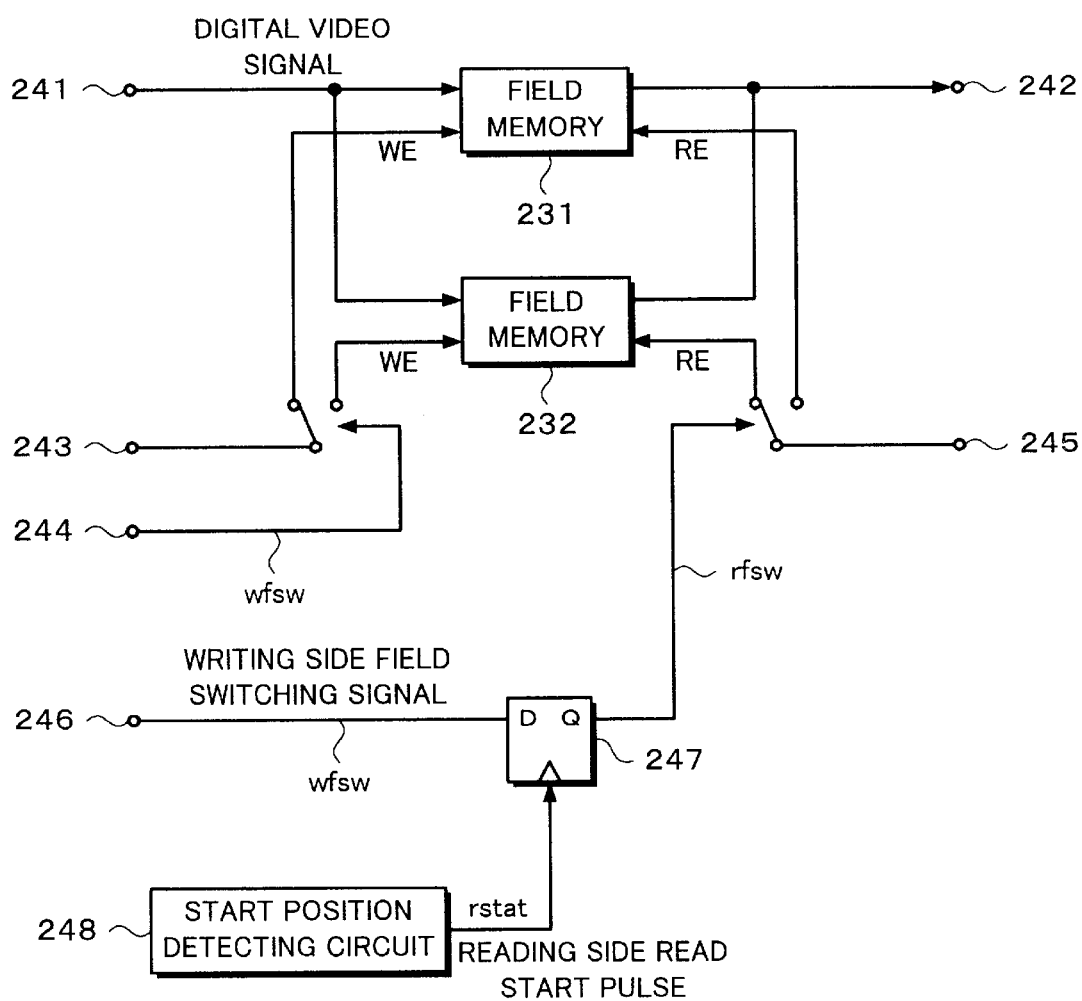
FIG. 5 is a block diagram for use in explanation of an example of the conventional image conversion processing circuit.
Figure 6:
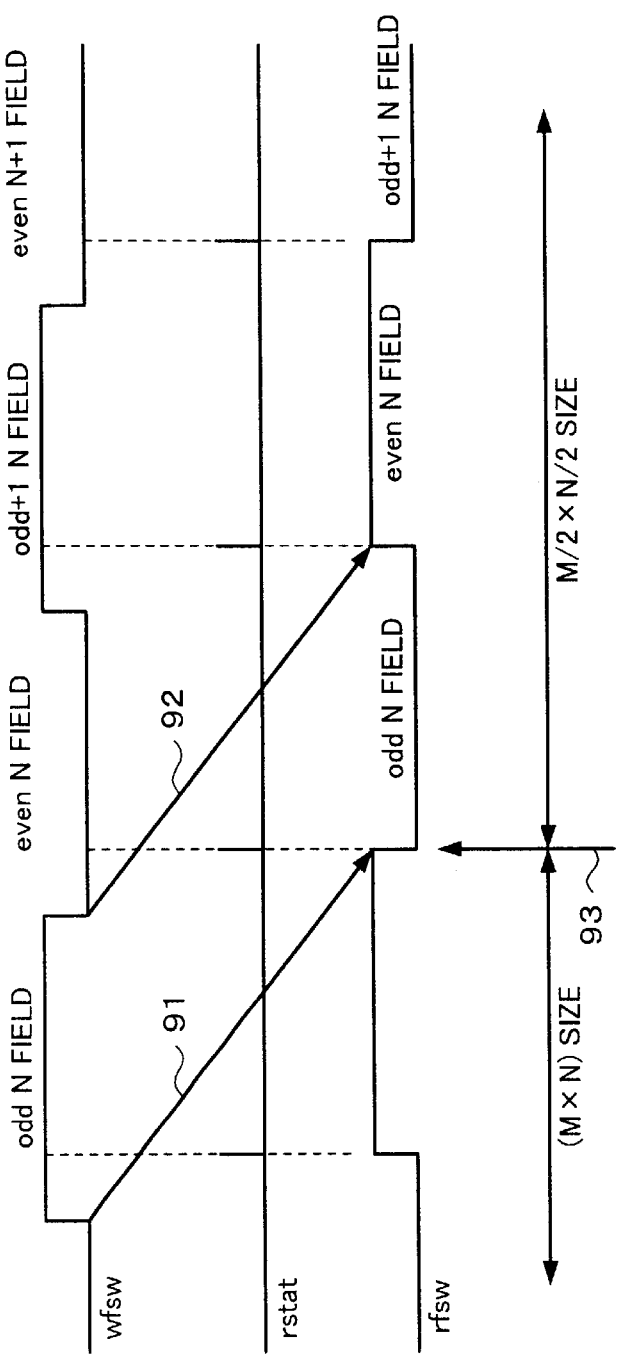
FIGS. 6A to 6D are timing charts for use of an explanation of an example of the conventional image conversion processing circuit.
Figure 7:
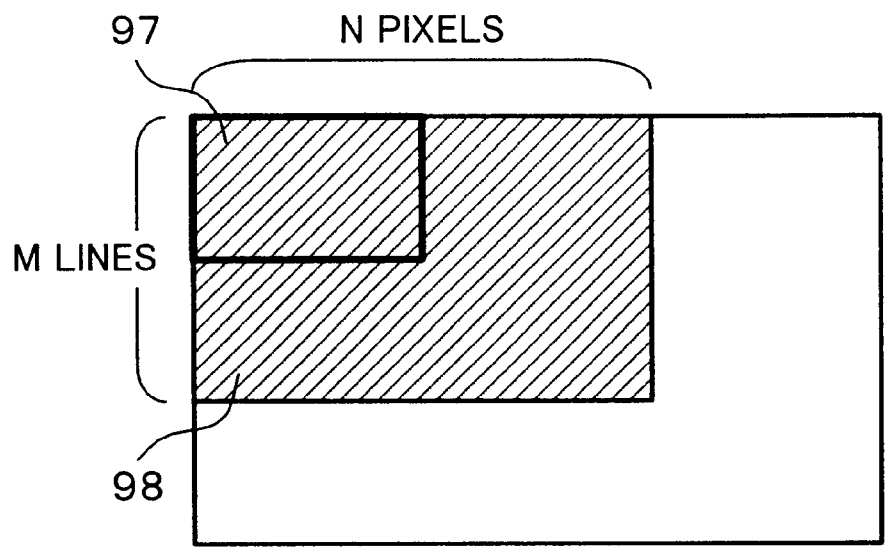
FIG. 7 is a schematic diagram for use in explanation of a process when an image size is continuously changed in the conventional image conversion processing circuit.
Figure 8:
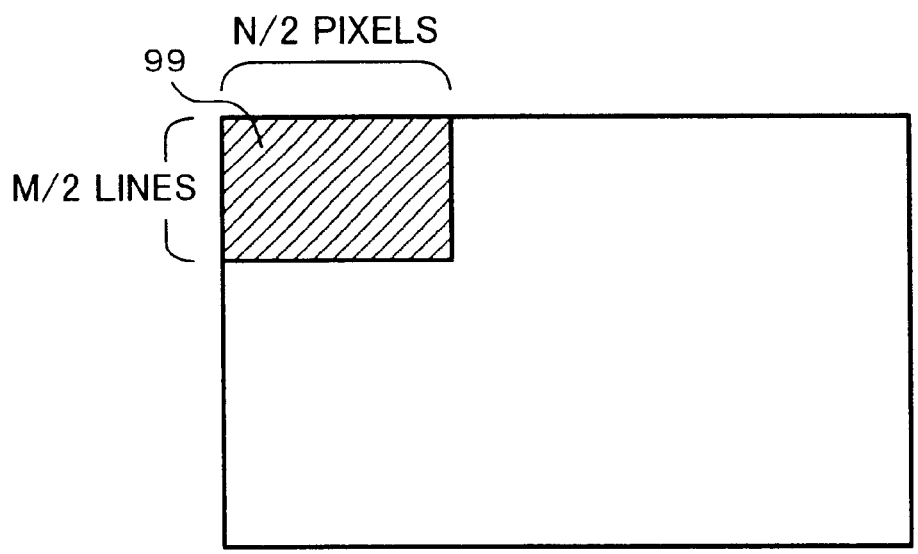
FIG. 8 is a schematic diagram for use in explanation of a process when an image size is continuously changed in the conventional image conversion processing circuit.
Figure 9:
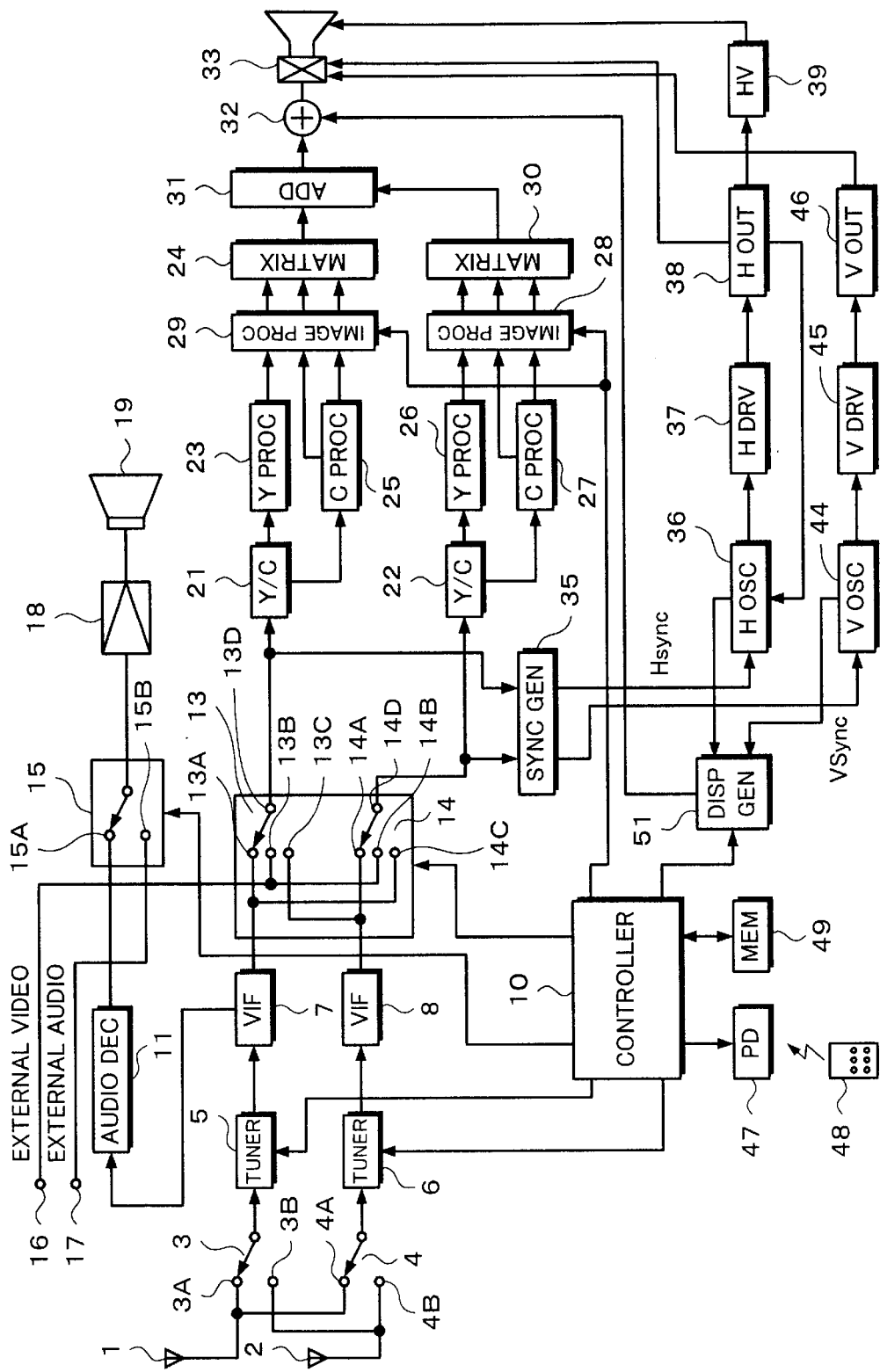
FIG. 9 is a block diagram of an example of a television receiver to which the invention can be applied.

An embodiment of the invention will now be described hereinbelow with reference to the drawings. The invention is suitable for use in a television receiver having what is called a picture-and-picture function which can simultaneously display two picture planes. FIG. 9 shows an example of the television receiver having such a picture-and-picture function.

In FIG. 9, reference numerals 1 and 2 denote antennas. Signals from a television broadcasting station are received by the antennas 1 and 2. The reception signal from the antenna 1 is supplied to a terminal 3A of an antenna switch 3 and to a terminal 4A of an antenna switch 4. The reception signal from the antenna 2 is supplied to an input terminal 3B of the antenna switch 3 and to an input terminal 4B of the antenna switch 4. An output of the antenna switch 3 is supplied to a tuner circuit 5. An output of the antenna switch 4 is supplied to a tuner circuit 6.

The antenna switch 3 switches the signal which is inputted to the tuner circuit 5 between the reception signal from the antenna 1 and the reception signal from the antenna 2. When the antenna switch 3 is set to the terminal 3A side, the reception signal from the antenna 1 is supplied to the tuner circuit 5 through the antenna switch 3. When the antenna switch 3 is set to the terminal 3B side, the reception signal from the antenna 2 is supplied to the tuner circuit 5 through the antenna switch 3.

The antenna switch 4 switches the signal which is inputted to the tuner circuit 6 between the reception signal from the antenna 1 and the reception signal from the antenna 2. When the antenna switch 4 is set to the terminal 4A side, the reception signal from the antenna 1 is supplied to the tuner circuit 6 through the antenna switch 4. When the antenna switch 4 is set to the terminal 4B side, the reception signal from the antenna 2 is supplied to the tuner circuit 6 through the antenna switch 4.

The tuner circuit 5 is a tuner circuit for a first picture plane. A desired reception channel to be displayed on the first picture plane is selected by the tuner circuit 5. This reception signal is converted into an intermediate frequency signal and supplied to an intermediate frequency and video detecting circuit 7.

The tuner circuit 6 is a tuner circuit for a second picture plane. A desired reception channel to be displayed on the second picture plane is selected by the tuner circuit 6. This reception signal is converted into an intermediate frequency signal and supplied to an intermediate frequency and video detecting circuit 8.

A channel set signal is supplied from a system controller 10 to the tuner circuits 5 and 6. Channels of the tuner circuits 5 and 6 are set by the tuner set signal. Information regarding the channels has been stored in a memory 49.

As mentioned above, in the television receiver to which the invention is applied, two tuner circuits of the tuner circuits 5 and 6 are provided and different channels can be set for the first and the second picture planes by the tuner circuits 5 and 6.

The intermediate frequency signal from the tuner circuit 5 is amplified and video detected by the intermediate frequency and video detecting circuit 7. Thus, a composite color video signal of, for example, the NTSC system to form the first picture plane is demodulated. The composite color video signal is supplied to a terminal 13A of a switching circuit 13 of a video source change-over switch 12 and to a terminal 14C of a switching circuit 14.

The intermediate frequency signal from the tuner circuit 6 for the second picture plane is amplified and the video signal is detected by the intermediate frequency and video detecting circuit 8. Thus, a composite color video signal of, for example, the NTSC system to form the second picture plane is demodulated. The composite color video signal is supplied to a terminal 14A of the switching circuit 14 of a video source change-over switch 12 and to a terminal 13C of the switching circuit 13.

An audio intermediate frequency signal is extracted from a beat component of, for example, 4.5 MHz by the intermediate frequency and video detecting circuit 7. The audio intermediate frequency signal is supplied to an audio decoder 11. An audio signal is demodulated by the audio decoder 11. The audio signal from the audio decoder 11 is supplied to a terminal 15A of an audio source change-over switch 15.

In the television receiver to which the invention is applied, an external video input terminal 16 and an external audio input terminal 17 are provided. The composite color video signal from the outside is supplied to the external video input terminal 16. The audio signal from the outside is supplied to the external audio input terminal 17.

The video signal from the external video input terminal 16 is supplied to a terminal 13B of the switching circuit 13 of the video source change-over switch 12 and to a terminal 14B of the switching circuit 14. The audio signal from the external audio input terminal 17 is supplied to a terminal 15B of the audio source change-over switch 15.

The video source change-over switch 12 switches video sources on the basis of a switch control signal from the system controller 10. The video source change-over switch 12 has the switching circuit 13 to select the video signal to be displayed on the first picture plane and the switching circuit 14 to select the video signal to be displayed on the second picture plane.

The video signal to be displayed on the first picture plane is outputted from an output terminal 13D of the switching circuit 13 of the video source change-over switch 12. The video signal to be displayed on the second picture plane is outputted from an output terminal 14D of the switching circuit 14.

The switching circuit 13 of the video source change-over switch 12 is switched to the terminal 13A side when the picture plane based on the video signal of the channel set by the tuner circuit 5 is displayed on the first picture plane, switched to the terminal 13B side when the picture plane based on the video signal from the external video input terminal 16 is displayed on the first picture plane, and switched to the terminal 13C side when the picture plane based on the video signal of the channel set by the tuner circuit 6 is displayed on the master picture plane.

The switching circuit 14 of the video source change-over switch 12 is switched to the terminal 14A side when the picture plane based on the video signal of the channel set by the tuner circuit 6 is displayed on the second picture plane, switched to the terminal 14B side when the picture plane based on the video signal from the external video input terminal 16 is displayed on the second picture plane, and switched to the terminal 14C side when the picture plane based on the video signal of the channel set by the tuner circuit 5 is displayed on the second picture plane.

The audio source change-over switch 15 switches audio sources on the basis of a switch control signal from the system controller 10. An output of the audio source change-over switch 15 is supplied to an audio amplifier 18. An output of the audio amplifier 18 is supplied to a speaker 19.

The audio change-over switch 15 is switched to the terminal 15A side when an audio sound based on the audio signal of the channel set by the tuner circuit 5 is generated and switched to the terminal 15B side when the audio sound based on the audio signal from the external audio input terminal 17 is generated.

The video signal of the first picture plane which is outputted from the output terminal 13D of the switching circuit 13 of the video source change-over switch 12 is supplied to a Y/C separating circuit 21. The video signal of the second picture plane which is outputted from the output terminal 14D of the switching circuit 14 is supplied to a Y/C separating circuit 22.

The Y/C separating circuit 21, a luminance signal processing circuit 23, a chroma signal processing circuit 25, an image processing circuit 29, and a matrix circuit 24 form three primary color signals R, G, and B to be displayed on the first picture plane.

That is, the video signal of the first picture plane is separated into a luminance signal Y and a chroma signal C by the Y/C separating circuit 21. The luminance signal Y from the Y/C separating circuit 21 is supplied to the luminance signal processing circuit 23. In the luminance signal processing circuit 23, picture quality adjustment and the like such as luminance adjustment, brightness adjustment, and the like are executed.

The chroma signal C from the Y/C separating circuit 21 is supplied to the chroma signal processing circuit 25. In the chroma signal processing circuit 25, a burst signal is extracted from the reception signal and color difference signals I and Q are demodulated by using the burst signal. An ACC (Automatic Color Control), a frequency characteristics correction, and the like are performed in the chroma signal processing circuit 25.

The luminance signal Y from the luminance signal processing circuit 23 and the color difference signals I and Q from the chroma signal processing circuit 25 are supplied to the image processing circuit 29. The image processing circuit 29 forms the first picture plane in case of displaying by picture-and-picture. Processes such as synchronous crossover, magnification and reduction of the picture plane, control of the display position, and the like are executed by the image processing circuit 29.

An output of the image processing circuit 29 is supplied to the matrix circuit 24. The three primary color signals R, G, and B for the first picture plane are formed by the matrix circuit 24 from the luminance signal Y and the color difference signals I and Q.

The Y/C separating circuit 22, a luminance signal processing circuit 26, a chroma signal processing circuit 27, an image processing circuit 28, and a matrix circuit 30 form the second picture plane.

That is, the video signal of the second picture plane is separated into a luminance signal Y and a chroma signal C by the Y/C separating circuit 22. The luminance signal Y from the Y/C separating circuit 22 is supplied to the luminance signal processing circuit 26. The chroma signal C is supplied to the chroma signal processing circuit 27. In the chroma signal processing circuit 27, a burst signal is extracted from the reception signal and color difference signals I and Q are demodulated by using the burst signal.

The luminance signal Y from the luminance signal processing circuit 26 and the color difference signals I and Q from the chroma signal processing circuit 27 are supplied to the image processing circuit 28. The image processing circuit 28 forms the second picture plane in case of displaying by picture-and-picture. Processes such as synchronous crossover, magnification and reduction of the picture plane, control of the display position, and the like are executed by the image processing circuit 28.

An output of the image processing circuit 28 is supplied to the matrix circuit 30. The three primary color signals R, G, and B for the first picture plane are formed by the matrix circuit 30 from the luminance signal Y and the color difference signals I and Q.

The three primary color signals R, G, and B of the first picture plane from the matrix circuit 24 and the three primary color signals R, G, and B of the second picture plane from the matrix circuit 30 are supplied to a synthesizing circuit 31. The three primary color signals R, G, and B of the first picture plane and the three primary color signals R, G, and B of the second picture plane are synthesized by the synthesizing circuit 31.

An output of the synthesizing circuit 31 is supplied to an adding circuit 32 of a display signal. A display signal is supplied from a display generating circuit 51 to the adding circuit 32. An output of the adding circuit 32 is supplied to an image receiving tube 33.

Horizontal and vertical sync signals are formed by a sync generating circuit 35 on the basis of horizontal and vertical sync signals of the video signal for the first picture plane and the video signal for the second picture plane. The horizontal sync signal is supplied to a horizontal oscillating circuit 36. The vertical sync signal is supplied to a vertical oscillating circuit 44.

A horizontal pulse synchronized with the horizontal sync signal from the sync generating circuit 35 is formed by the horizontal oscillating circuit 36. The horizontal pulse is supplied to a horizontal output circuit 38 through a horizontal driving circuit 37. A horizontal saw-tooth wave current is supplied to a horizontal deflecting coil of the image receiving tube 33 by the horizontal output circuit 38.

In this instance, a flyback pulse is generated for a blanking period of the saw-tooth wave. The flyback pulse is fed back to the horizontal oscillating circuit 36. The feedback pulse and the output of the horizontal oscillating circuit 36 are phase compared. An oscillating frequency is controlled on the basis of a comparison output. Thus, an AFC (Automatic Frequency Control) loop is formed and the stable oscillating operation of the horizontal oscillating circuit 36 is held.

The flyback pulse is stepped up and a high voltage is formed by a high voltage circuit 39. The high voltage is applied as an anode voltage or a focusing voltage to the image receiving tube 33.

A saw-tooth wave synchronized with the vertical sync signal from the sync generating circuit 35 is formed by the vertical oscillating circuit 44. An output of the vertical oscillating circuit 44 is supplied to a vertical output circuit 46 through a vertical driving circuit 45. A vertical saw-tooth wave current is supplied to a vertical deflecting coil of the image receiving tube 33 by the vertical output circuit 46.

The system controller 10 controls the whole operation. An input is supplied from a remote commander 48 to the system controller 10 through a photosensing circuit 47. A reception channel or the like is set on the basis of this input. A display signal is generated from the display generating circuit 51 on the basis of an output of the system controller 10.

A horizontal pulse and a vertical pulse synchronized with the horizontal sync signal and the vertical sync signal are supplied from the horizontal oscillating circuit 36 and vertical oscillating circuit 44 to the display generating circuit 51. A display signal is generated from a display generating circuit 40 at a timing based on the horizontal and vertical pulses. The display signal is supplied to the adding circuit 32.

In the adding circuit 32, the display signal from the display generating circuit 51 is multiplexed to the three primary color signals R, G, and B from the synthesizing circuit 31. Thus, a setting state of the channel and a sound volume is displayed on the image receiving tube 33.

As mentioned above, the two tuner circuits 5 and 6 are provided for the television receiver to which the invention can be applied, and two picture planes can be simultaneously displayed. The image processing circuits 28 and 29 are provided to perform the synchronous crossover of the picture planes of two systems and set the image sizes and display positions.

Figure 10:
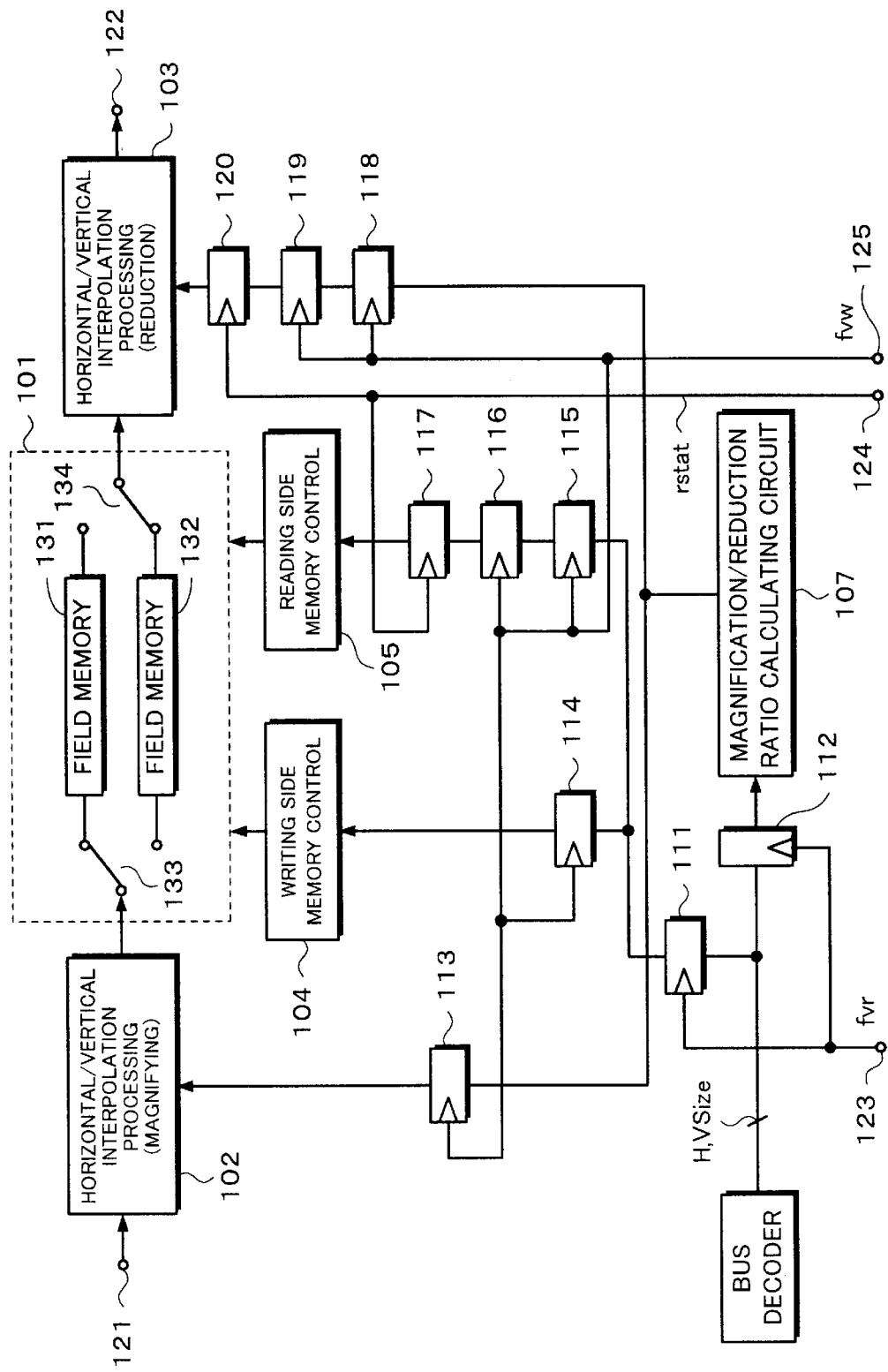
FIG. 10 is a block diagram of an example of an image conversion processing circuit to which the invention is applied.

FIG. 10 shows an example of the image processing circuits 28 and 29 which can be applied to such a television receiver. In FIG. 10, a memory portion 101 is constructed by two field memories 131 and 132 and two switching circuits 133 and 134. The writing and reading operations of the two field memories 131 and 132 are switched every field by the switching circuits 133 and 134.

The switching circuits 133 and 134 equivalently express processes which are eventually performed by controlling the writing and reading operations to/from the two field memories 131 and 132.

A writing side memory control circuit 104 and a reading side memory control circuit 105 are provided for the memory portion 101. The writing side memory control circuit 104 controls the field memory serving as a writing side between the field memories 131 and 132. The reading side memory control circuit 105 controls the field memory serving as a reading side between the field memories 131 and 132.

A horizontal/vertical interpolation processing circuit 102 performs an interpolating process so as not to cause a deterioration of a picture plane when the picture plane is reduced. That is, although a decimating process is performed in the memory portion 101 in case of reducing the image size, if the decimating process is simply performed, an aliasing distortion occurs and the picture quality deteriorates. To prevent the deterioration of the picture quality, the interpolating process is performed to the inputted image data by the horizontal/vertical interpolation processing circuit 102. A horizontal/vertical interpolation processing circuit 103 for the magnifying process performs an interpolating process when the image size is magnified.

Control information for the image processes is inputted to a bus decoder 106 through an internal bus led out from the system controller 10 (refer to FIG. 9) of the television receiver. The control information is generated, for example, in accordance with the setting state of switches or the like on the operation panel of the television receiver.

Image size information (H, VSize) is formed from the bus decoder 106 in accordance with the control information from the system controller 10. The image size information (H, VSize) is supplied to latch circuits 111 and 112. A vertical read clock fvr is supplied from an input terminal 123 to the latch circuits 111 and 112. The image size information (H, VSize) is fetched into the latch circuits 111 and 112 at a timing of the vertical read clock fvr.

The image size information (H, VSize) from the latch circuit 111 is supplied to the writing side memory control circuit 104 through a latch circuit 114. The vertical write clock fvw is supplied from an input terminal 125 to the latch circuit 114.

The image size information (H, VSize) from the latch circuit 111 is supplied to the reading side memory control circuit 105 through latch circuits 115, 116, and 117. The vertical write clock fvw is supplied to the latch circuits 115 and 116. The vertical read start pulse signal rstat from an input terminal 124 is supplied to the latch circuit 117.

The image size information (H, VSize) from the latch circuit 112 is supplied to a magnification/reduction ratio calculating circuit 107. The magnification/reduction ratio calculating circuit 107 forms interpolation processing information according to its aspect ratio on the basis of the image size information (H, VSize).

In case of the reducing process, the interpolation processing information formed in the magnification/reduction ratio calculating circuit 107 is supplied to the horizontal/vertical interpolation processing circuit 102 for the reducing process through a latch circuit 113. The vertical write clock fvw is supplied to the latch circuit 113.

In case of the magnifying process, the interpolation processing information formed in the magnification/reduction ratio calculating circuit 107 is supplied to the horizontal/vertical interpolation processing circuit 103 for the magnifying process through latch circuits 118, 119, and 120. The vertical write clock fvw is supplied to the latch circuits 118 and 119. The vertical read start pulse signal rstat is supplied to the latch circuit 120.

In the writing side memory control circuit 104, the field memory on the writing side between the field memories 131 and 132 is controlled in accordance with the image size information (H, VSize). Similarly, in the reading side memory control circuit 105, the field memory on the reading side between the field memories 131 and 132 is controlled in accordance with the image size information (H, VSize).

In case of performing the process to reduce the image size, the image size information (H, VSize) to set the reduction picture plane is outputted from the bus decoder 106. The image size information (H, VSize) to set the reduction picture plane is fetched into the latch circuit 111, supplied to the writing side memory control circuit 104 through the latch circuit 114, and supplied to the reading side memory control circuit 105 through the latch circuits 115, 116, and 117. In case of reducing the image size, the interpolation processing information for the horizontal/vertical interpolation processing circuit 102 is calculated by the magnification/reduction ratio calculating circuit 107 in accordance with the image size information (H, VSize). The interpolation processing information is set into the horizontal/vertical interpolation processing circuit 102 through the latch circuit 113.

The digital video signal is inputted to an input terminal 121. The video signal is supplied to the horizontal/vertical interpolation processing circuit 102. In the horizontal/vertical interpolation processing circuit 102, the interpolating process is performed to prevent the deterioration of the picture quality on the basis of the interpolation processing information from the magnification/reduction ratio calculating circuit 107.

The writing and reading operations of the field memories 131 and 132 are switched every field by the switching circuits 133 and 134. An output of the horizontal/vertical interpolation processing circuit 102 is written into the field memory serving as a writing side between the field memories 131 and 132 through the switching circuit 133.

The writing operation to the field memory is controlled by the writing side memory control circuit 104. The image size information (H, VSize) fetched in the latch circuit 111 is sent from the bus decoder 106 to the writing side memory control circuit 104 through the latch circuit 114. In case of reducing the image size, the input video signal is decimated by the writing side memory control circuit 104 and written into the field memories 131 and 132. After completion of the writing of the video signal of one field, the switching circuit 133 is switched and the writing side field memory is switched.

The reading operation from the field memory serving as a reading side between the field memories 131 and 132 is controlled by the reading side memory control circuit 105. The image size information (H, VSize) fetched in the latch circuit 111 is sent from the bus decoder 106 to the reading side memory control circuit 105 through the latch circuits 115, 116, and 117. In case of reducing the image size, the video signal of one field is continuously read out from the field memory serving as a reading side between the field memories 131 and 132. After completion of the reading of the video signal of one field, the switching circuit 134 is switched and the reading side field memory is switched.

An output of the switching circuit 134 is supplied to the horizontal/vertical interpolation processing circuit 103. In case of reducing the image size, the output of the switching circuit 134 is outputted as it is from an output terminal 122 through the horizontal/vertical interpolation processing circuit 103.

As mentioned above, since the video signal decimated in accordance with the image size is accumulated in the field memories 131 and 132 and the video signal is continuously read out, the image of the reduced image size can be obtained from the video signal at the output terminal 122.

In case of performing the process of magnifying the image size, the image size information (H, VSize) to set the magnified picture plane is outputted from the bus decoder 106. The image size information (H, VSize) to set the magnified picture plane is fetched into the latch circuit 111, supplied to the writing side memory control circuit 104 through the latch circuit 114, and supplied to the reading side memory control circuit 105 through the latch circuits 115, 116, and 117. In case of magnifying the image size, the interpolation processing information for the horizontal/vertical interpolation processing circuit 103 is calculated by the magnification/reduction ratio calculating circuit 107 in accordance with the image size information (H, VSize). The interpolation processing information is set into the horizontal/vertical interpolation processing circuit 103 through the latch circuits 118, 119, and 120.

The digital video signal is inputted to the input terminal 121. The video signal is supplied to the horizontal/vertical interpolation processing circuit 102. In case of performing the process to magnify the image size, the video signal from the input terminal 121 is supplied as it is to the switching circuit 133 through the horizontal/vertical interpolation processing circuit 102.

The writing and reading operations of the field memories 131 and 132 are switched every field by the switching circuits 133 and 134. An output of the horizontal/vertical interpolation processing circuit 102 is written into the field memory serving as a writing side between the field memories 131 and 132 through the switching circuit 133.

The writing operation to the field memory is controlled by the writing side memory control circuit 104. The image size information (H, VSize) fetched in the latch circuit 111 is sent from the bus decoder 106 to the writing side memory control circuit 104 through the latch circuit 114. In case of magnifying the image size, the input video signal is continuously written into the field memories 131 and 132. After completion of the writing of the video signal of one field, the switching circuit 133 is switched and the writing side field memory is switched.

The reading operation from the field memory serving as a reading side between the field memories 131 and 132 is controlled by the reading side memory control circuit 105. The image size information (H, VSize) fetched in the latch circuit 111 is sent from the bus decoder 106 to the reading side memory control circuit 105 through the latch circuits 115, 116, and 117. In case of magnifying the image size, the video signal of one field is read out from the field memory serving as a reading side between the field memories 131 and 132 in accordance with the image size.

After completion of the reading of the video signal of one field, the switching circuit 134 is switched and the reading side field memory is switched. The output of the switching circuit 134 is supplied to the horizontal/vertical interpolation processing circuit 103.

In case of magnifying the image size, the interpolating process is performed by the horizontal/vertical interpolation processing circuit 103 in order to magnify and interpolate the picture plane on the basis of the interpolation processing information from the magnification/reduction ratio calculating circuit 107. An output of the magnification/reduction ratio calculating circuit 107 is supplied to the horizontal/vertical interpolation processing circuit 103 through the latch circuits 118, 119, and 120.

As mentioned above, the data in the field memories is read out in accordance with the image size and the interpolation magnifying process is performed in the horizontal/vertical interpolation processing circuit 103. Thus, the magnified and interpolated image is obtained from the output terminal 122.

In the image processing circuit to which the invention is applied, the image size information (H, VSize) from the bus decoder 106 is fetched into the latch circuit 111. The image size information (H, VSize) is inputted to the writing side memory control circuit 104 through the latch circuit 114 and supplied to the reading side memory control circuit 105 through the latch circuits 115, 116, and 117. The interpolation information obtained by the magnification/reduction ratio calculating circuit 107 is inputted through the latch circuit 113 to the horizontal/vertical interpolation processing circuit 102 when performing the reducing process and inputted through the latch circuits 118, 119, and 120 to the horizontal/vertical interpolation processing circuit 103 when performing the magnifying process.

As mentioned above, since the image size information (H, VSize) set in the reading side memory control circuit 105 has a delay for the image size information (H, VSize) set in the writing side memory control circuit 104, when the image size is continuously changed, the writing and reading operations are performed in the same image size. Thus, the smooth scaling can be performed.

That is, the vertical read pulse fvr is supplied to the input terminal 123 at a timing as shown in FIG. 11A and the vertical write pulse fvw is supplied to the input terminal 125 at a timing as shown in FIG. 11B. As shown in FIG. 1C, the reading timing is set by the vertical read start pulse rstat. The writing side field memory between the field memories 131 and 132 is switched synchronously with the vertical write pulse fvw as shown in FIG. 11I. The reading side field memory between the field memories 131 and 132 is switched at the timing based on the vertical write pulse fvw as shown in FIG. 11J.

Now assuming that the image size information (H, VSize) regarding the change in image size is outputted from the bus decoder 106, the image size information (H, VSize) is fetched into the latch circuits 111 and 112 at the timing of the vertical read signal fvr as shown in FIG. 1D. As shown in FIG. 11E, the image size information (H, VSize) is fetched into the latch circuits 114 and 115 at the timing of the vertical write pulse fvw. The writing side memory control circuit 104 is set by an output of the latch circuit 114. Therefore, a period of time shown at 63 in FIG. 11H becomes the timing to which the change in image size is reflected in the writing side field memory.

An output of the latch circuit 115 is fetched into the latch circuit 116 at the timing of the vertical write pulse fvw (FIG. 11B) as shown in FIG. 11F. An output of the latch circuit 116 is fetched into the latch circuit 117 at the timing of the read start pulse rstat (FIG. 1C) as shown in FIG. 11G. The reading side memory control circuit 105 is set by an output of the latch circuit 117. Therefore, a period of time shown at 64 in FIG. 11H becomes the timing to which the change in image size is reflected in the reading side field memory.

Therefore, as shown by arrows 61 and 62 in FIGS. 11I and 11J, the reading operation is performed in a state with a delay of about one field period for the writing operation. With respect to the changing process of the image size as well, in a manner similar to the above, as shown by arrows 63 and 64 in FIG. 11H, the reading process is delayed by about one field period for the writing process. Therefore, the timing to which the new size setting is reflected on the reading side coincides with the delay of one field of the reading operation due to the overtaking process, so that the size upon writing and the size upon reading can be always made coincide.

In the embodiment of the invention, the construction using the latch circuits as timing control means for controlling the timing to perform the changing process of the image size has been described. However, if the process can be delayed by about one field period with regard to the writing process and the reading process, any other circuit can be used and the invention is not limited to the connecting relation of the latch circuits.

According to the invention, the latch circuits are provided as timing control means for controlling the timing to perform the changing process of the image size, the changing process of the image size is performed on the basis of the control information which is supplied through the latch circuits, and the timing to change the image size in the reading process is delayed for the timing to change the image size in the writing process in accordance with the delay difference between the writing timing and the reading timing to/from the field memory in association with the process for a countermeasure against the overtake.

According to the invention, therefore, even when the sizes and display positions of two picture planes are arbitrarily set and the synchronous crossovers are simultaneously executed, an overtake such that the time relation of the data is reversed does not occur at the time of reading out the image data. Even when the size is continuously changed, the writing size to the field memories and the reading size therefrom can be always made coincide and the smooth display can be performed.

INDUSTRIAL APPLICABILITY

As mentioned above, the invention is suitable for use in a television receiver having the picture-in-picture or picture-and-picture function.

What is claimed is:

1. An image processing apparatus comprising:

a first field memory and a second field memory;

writing side memory control means for controlling the operation of a field memory serving as a writing side between said first field memory and said second field memory;

reading side memory control means for controlling the operation of a field memory serving as a reading side between said first field memory and said second field memory; and delay means for allowing a delay difference to be provided between a timing of image size information which is set in said writing side memory control means and a timing of image size information which is set in said reading side memory control means in a manner such that an image size when data is written into said first and said second field memories and an image size when the data is read out from said first and said second field memories coincide, characterized in that said image size information is set so that said writing side memory control means and said reading side memory control means have said delay difference, the image size is set by controlling said first field memory and said second field memory by said writing side memory control means and said reading side memory control means in accordance with said image size information, and a switching control of every field is performed in a manner such that while a writing process is performed to one of said field memories, a reading process is performed to the other field memory.

2. An apparatus according to claim 1, wherein interpolation processing means for reducing the image size to improve a picture quality when the image size is reduced is provided at a front stage of said first and said second field memories.

3. An apparatus according to claim 1, wherein interpolation processing means for magnifying the image size to magnify and interpolate a picture plane is provided at a post stage of said first and said second field memories.

4. An apparatus according to claim 1, wherein interpolation processing means for reducing the image size to improve a picture quality when the image size is reduced is provided at a front stage of said first and said second field memories, and interpolation processing means for magnifying the image size to magnify and interpolate a picture plane is provided at a post stage of said first and said second field memories.

5. An apparatus according to claim 4, further comprising delay means for allowing a delay difference to be provided between a timing of a magnification/reduction ratio which is set into the interpolation processing means for reducing said image size and a timing of a magnification/reduction ratio which is set into the interpolation processing means for magnifying said image size in a manner such that the image size when the data is written into said first and said second field memories and the image size when the data is read out from said first and said second field memories coincide.

6. An image processing method characterized by comprising the steps of:
controlling a field memory serving as a writing side between a first field memory and a second field memory by memory control means on the writing side and controlling the field memory serving as a reading side by memory control means on a reading side;
allowing a delay difference to be provided between a setting timing of image size information which is set into said writing side memory control means and a setting timing of image size information which is set into said reading side memory control means in a manner such that an image size when data is written into said first and said second field memories and an image size when the data is read out from said first and said second field memories coincide and setting said image size information into said writing side memory control means and said reading side memory control means;
setting the image size by controlling said first field memory and said second field memory by said writing side memory control means and said reading side memory control means in accordance with said image size information; and
performing a switching control of every field in a manner such that while a writing process is performed to one of said field memories, a reading process is performed to the other field memory.

7. A method according to claim 6, wherein an interpolating process is performed at a front stage of said first and said second field memories by interpolation processing means for reducing the image size to improve a picture quality when the image size is reduced.

8. A method according to claim 6, wherein an interpolating process is performed at a post stage of said first and said second field memories by interpolation processing means for magnifying the image size to magnify and interpolate a picture plane when the image size is magnified.

9. A method according to claim 6, wherein an interpolating process is performed at a front stage of said first and said second field memories by interpolation processing means for reducing the image size to improve a picture quality when the image size is reduced, and
an interpolating process is performed at a post stage of said first and said second field memories by interpolation processing means for magnifying the image size to magnify and interpolate a picture plane when the image size is magnified.

10. A method according to claim 9, further comprising the step of allowing a delay difference to be provided between a timing of a magnification/reduction ratio which is set into said interpolation processing means for reducing said image size and a timing of a magnification/reduction ratio which is set into said interpolation processing means for magnifying said image size in a manner such that the image size when the data is written into said first and said second field memories and the image size when the data is read out from said first and said second field memories coincide.

11. A television receiver comprising:
first demodulating means for demodulating a first video signal;
second demodulating means for demodulating a second video signal; and
image processing means for processing said first and/or said second video signal so as to synthesize the first video signal demodulated by said first demodulating means and the second video signal demodulated by said second demodulating means,
characterized in that said image processing means is constructed by
a first field memory and a second field memory,
writing side memory control means for controlling the operation of a field memory serving as a writing side between said first field memory and said second field memory,
reading side memory control means for controlling the operation of a field memory serving as a reading side between said first field memory and said second field memory, and
delay means for allowing a delay difference to be provided between a timing of image size information which is set in said writing side memory control means and a timing of image size information which is set in said reading side memory control means in a manner such that an image size when data is written into said first and said second field memories and an image size when the data is read out from said first and said second field memories coincide,
said image size information is set into said writing side memory control means and said reading side memory control means, and the image size is set by controlling said first field memory and said second field memory by said writing side memory control means and said reading side memory control means in accordance with said image size information, and
a switching control of every field is performed in a manner such that while a writing process is performed to one of said field memories, a reading process is performed to the other field memory.

12. A receiver according to claim 11, wherein interpolation processing means for reducing the image size to improve a picture quality when the image size is reduced is provided at a front stage of said first and said second field memories.

13. A receiver according to claim 11, wherein interpolation processing means for magnifying the image size to magnify and interpolate a picture plane is provided at a post stage of said first and said second field memories.

14. A receiver according to claim 11, wherein interpolation processing means for reducing the image size to improve a picture quality when the image size is reduced is provided at a front stage of said first and said second field memories, and interpolation processing means for magnifying the image size to magnify and interpolate a picture plane is provided at a post stage of said first and said second field memories.

15. A receiver according to claim 14, further comprising delay means for allowing a delay difference to be provided between a timing of a magnification/reduction ratio which is set into the interpolation processing means for reducing said image size and a timing of a magnification/reduction ratio which is set into the interpolation processing means for magnifying said image size in a manner such that the image size when the data is written into said first and said second field memories and the image size when the data is read out from said first and said second field memories coincide.

* * * * *